Aug. 15, 1961 J. C. MASON 2,996,320
HIGH PRESSURE FLUID SEALING MEANS
Filed Jan. 19, 1959
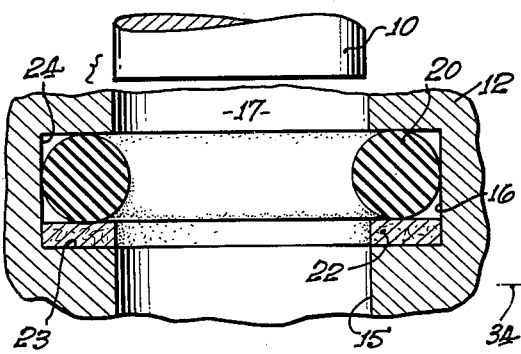
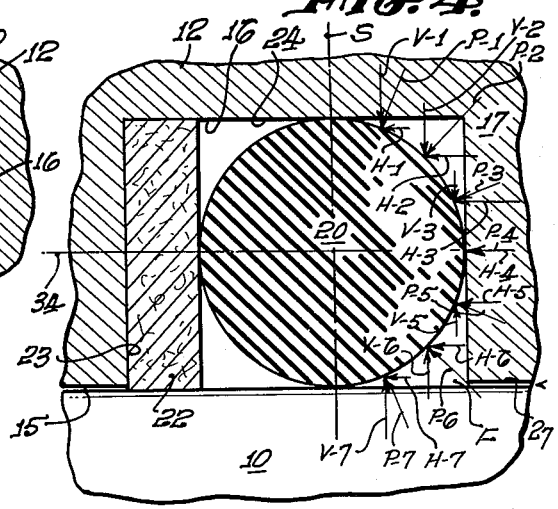
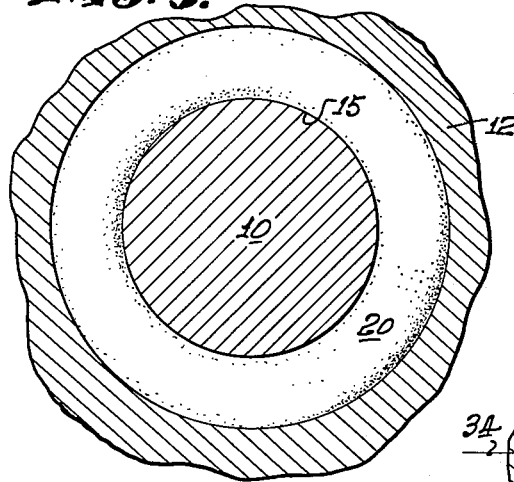
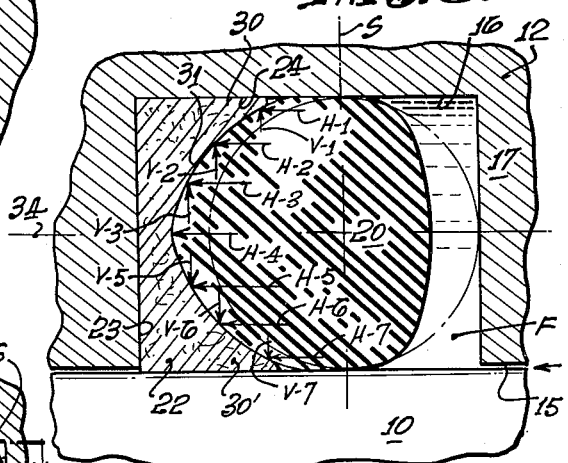
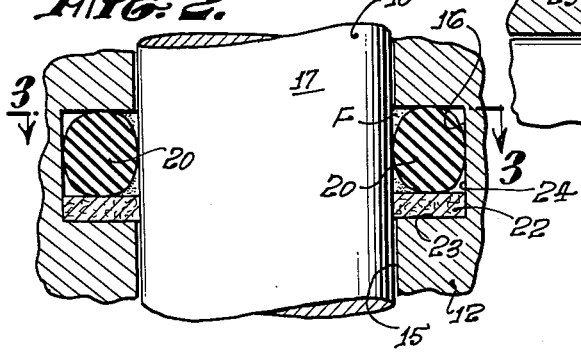
JAMES C. MASON,
INVENTOR.
BY
William C. Babcock
ATTORNEY.

United States Patent Office 2,996,320
Patented Aug. 15, 1961

2,996,320
HIGH PRESSURE FLUID SEALING MEANS
James C. Mason, 3521 Lime Ave., Long Beach, Calif.
Filed Jan. 19, 1959, Ser. No. 787,498
1 Claim. (Cl. 286—26)

This invention relates to sealing apparatus and more particularly to an improved high pressure fluid seal between a shaft rotatably mounted with respect to a body through which it extends.

In the prior state of the fluid sealing art many means for affecting a fluid seal about a shaft which is rotatable within a bearing or in which the bearing rotates about the shaft have been used. A common sealing element utilized for fluid sealing about a cylindrical shaft is an elastomeric toroidal element commonly designated as an O-ring. In addition to the use of O-rings alone or in spaced plurality along a shaft, O-rings have been used in combination with other elements to obtain a fluid seal of high pressure fluid. In the prior state of the art, however, high pressure fluid sealing means are not efficiently effective or are complex in configuration and expensive of manufacture.

Accordingly, it is an object of the present invention to provide an improved high pressure fluid sealing means for sealing the path of high pressure fluid flow between a shaft and bearing.

It is another object of the present invention to provide a high pressure fluid seal about a shaft which is simple and rugged in construction.

Another object of the present invention is to provide an efficient high pressure fluid seal between a shaft and bearing which is economical to manufacture and easily installed.

The novel features which are believed to be characteristic of the invention, both as to its apparatus and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

The present invention is an improved means for forming a high pressure fluid seal between a shaft and a body through which it extends and with respect to which it is rotatable. The sealing means includes in combination a circumferentially extending groove defined by the body surrounding the shaft, which groove is of rectangular transverse cross-section. Positioned within the groove is an O-ring having a substantially circular transverse cross-section with an outside toroidal diameter substantially equal to the greatest diameter of the groove and an inside diameter in sliding contact with the shaft. An annular deformable washer member is positioned between the longitudinal wall of the groove, which is at the low pressure side of the groove, and the O-ring, in contact with each. The deformable member is of substantially rectangular transverse cross-section with the outside diameter thereof substantially equal to the greatest diameter of the groove and the inside diameter in sliding contact with the shaft.

In the drawing:

FIGURE 1 is a view in longitudinal cross-section of the fluid seal assembly with the shaft removed to show the components in a relaxed condition;

FIGURE 2 is a view similar to FIGURE 1 showing the shaft in position and the sealing components in sealing contact therewith;

FIGURE 3 is a sectional view taken along line 3—3 of FIGURE 2;

FIGURE 4 is a partial enlarged view of the sealing components with force diagrams shown for purposes of explanation and description; and FIGURE 5 is a view similar to FIGURE 4 with the sealing components shown in the deformed condition due to fluid pressure.

Referring now to the drawing there is shown in FIGURES 1 through 3 an illustrative embodiment of the sealing means of the present invention. Although the present invention is equally applicable to a device in which a shaft rotates within a stationary body which supports and surrounds the shaft, or to a device in which the shaft is stationary and the body rotates about it, the embodiment utilizing a rotating shaft will be described for purpose of illustration. In general, a shaft 10 is rotatably supported by a body 12 which defines a bearing surface 15 with which the shaft is mateable and in bearing contact. The body 12 defines a circumferential recess 16 surrounding the shaft transversely thereto. The recess or groove 16 is of substantially rectangular transverse cross-section and with the shaft in position within the body forms a closed annulus. The purpose of the sealing means is to prevent the passage of high pressure fluid along the shaft exterior and through the body. For purpose of illustration the high pressure fluid is shown to be to the right of the sealing means in FIGURES 4 and 5 and to the upper side of FIGURES 1 and 2 and its passage through the body to the lower side or to the left is to be prevented. The high pressure side 17 of the sealing means, or the upper and right side in the figures is designated as the upstream side while the low pressure side is designated the downstream side. Positioned within the groove 14 is an O-ring 20 of the type well known to the art formed of rubber or other elastomeric material. The O-ring is circular in transversee cross-section and has an outside diameter substantially equal to but greater than the major diameter of the annular groove 16 and a minor diameter substantially equal to but less than the diameter of the shaft 10. Thus, the O-ring when within the annular groove without the shaft in position will be in contact with the outer circumferential surface of the groove 16 while the inner diameter of the O-ring will extend somewhat inward beyond the diameter of the bearing surface 15 as shown in FIGURE 1. With the shaft in position within the body, however, the inside diameter of the O-ring is in contact with the outer surface of the shaft.

A deformable annular member 22 of substantially rectangular cross-section is positioned within the groove 16 at the downstream side of the O-ring. In the presently preferred embodiment a leather washer is used which has an outside diameter substantially equal to the greater diameter of the groove 16 and an inside diameter substantially equal to the diameter of the shaft 10. The washer 22 is positioned in contact with the O-ring and with the downstream wall 23 of the groove 16. Thus, with the shaft 10 positioned within the bearing the O-ring is in contact with the outer wall 24 of the groove 16 and with the circumference of the shaft 10. Since the lesser diameter of the O-ring 20 is smaller than the outside diameter of the shaft 10, the insertion of the shaft past the O-ring causes the O-ring to be slightly deformed as shown in FIGURE 2. The washer 22 is in contact with the outer wall 24 of the groove, the downstream wall 23 of the groove and the circumference of the shaft 10. It has been found that the use of an O-ring as described hereinbefore and a deformable washer positioned between the O-ring and a downstream wall of the sealing groove provides an excellent seal against the passage of fluid under high pressure along the shaft 10.

Referring now to FIGURES 4 and 5, although the reason for the excellent fluid sealing accomplished by an O-ring and deformable washer in the combination of the present invention is not fully understood, the apparent reason for such superior sealing is illustrated in the figures diagrammatically. As shown in FIGURE 4, high pressure fluid F is present at the upstream side of the sealing element due to the passage of fluid between the shaft and the bearing wall 27, upstream of the sealing recess 16. The fluid F flows into the annular shaped space defined by the exterior of the shaft and the sealing recess 16. The fluid passes into the recess 16 to the outer diameter thereof and fills the upstream spaces surrounding the O-ring above the contact line of the O-ring with the shaft and with the outer wall 24 of the recess 16 as shown in FIGURE 4. Thus, the portion of the O-ring surface, which is on the upstream side of the sealing line S, may be designated the upstream surface of the O-ring. The fluid F under high pressure causes forces to be applied radially to the upstream surface of the O-ring and these forces are represented in magnitude and direction by a series of vectors P–1 to P–7 inclusive of unit length shown in FIGURE 4. The force exerted by each vector P–1 to P–7 inclusive on the upstream surface of the O-ring can be resolved into horizontal components H–1 to H–7 inclusive, which are parallel to the longitudinal axis of the shaft 10, and vertical components V–1 to V–7 which are perpendicular to the longitudinal axis of the shaft 10. From FIGURE 4 it can be seen that when the force parallelograms of which vectors P–1 to P–7 are the resultants are resolved as above mentioned, that the force components H–1 to H–7 increase in magnitude as the centerline or sealing line S through the O-ring is approached. Thus, the force P–4 whch is applied in a horizontal plane transverse to the sealing axis S has no vertical component of force and is of maximum horizontal magnitude. Due to the varying magnitudes of the horizontal force of H–1 to H–7, the O-ring when subjected to fluid pressure deforms to the configuration shown in FIGURE 5. Referring to FIGURE 5 the material of the O-ring is restricted to movement toward the leather washer 22 and as a result there is a greater volume of deformed O-ring material on the lefthand side of the sealing line S in FIGURE 5, than on the right-hand side thereof, and the O-ring has assumed a configuration at which a relatively large portion of the O-ring is in contact with the shaft 10. As discussed hereinbefore, and shown in FIGURE 4, the transverse area of the leather washer 22, prior to being subjected to fluid pressure, is generally rectangular in shape. However, upon the application of pressure from the O-ring the washer 22 deforms, with this deformation at the upper and lower portions of the washer taking place toward the O-ring and filling the spaces between the O-ring and the shaft circumference and the circumference of the outer wall 24. These deformed sections are designated generally as 30 and 30' in FIGURE 5. The particular shape which the O-ring takes when subjected to deforming fluid pressure as described above was obtained by taking the vectors H–1 to H–7 inclusive. These same vector forces would be transmitted through the O-ring to the downstream surface 31 of the O-ring. The downstream horizontal vector components acting upon the downstream surface of the O-ring and the surface of the leather washer 22 are indicated in FIGURE 5 as vectors $H_1$ through $H_7$ while the vertical vector components are designated as $V_1$ through $V_7$.

Since these vector forces are transmitted to the surface of the washer 22, it will be noted that from the horizontal centerline through the O-ring and washer the vertical components of the forces acting on the deformed part of the leather washer constantly increase in magnitude, with the forces $V_1$ and $V_7$ being the maximum and corresponding to the portion of the washer at the outer wall of the recess and at the circumference of the shaft. Accordingly, the greater the force exerted by the hydraulic fluid under pressure on the O-ring, the greater will be the pressure exerted by the O-ring on the leather washer and also the greater will be the vertically directed forces $V_1$ and $V_7$ exerted on the leather washer to hold it in fluid sealing contact with the outer wall 24 of the recess and the surface of the shaft 10.

Thus, the present invention by use of a combination of elastomeric O-ring and deformable washer in an annular recess about a shaft provides an improved and efficient sealing means for preventing the flow of high pressure fluid between a shaft and a body which are relatively rotatable. The combination of the O-ring and deformable washer, together with the composition of both obtains a sealing effect which is increased as the pressure of the fluid to be sealed is increased.

What is claimed is:

A device for sealing against fluid at high presure between the external surface of a rotating shaft of circular transverse cross section that is journaled in a body in which a cylindrical bearing is formed that has a groove defined therein by a recessed circumferentially extending surface and first and second longitudinally spaced ring-shaped surfaces which extend outwardly from said recessed surface to terminate at the surface of said bearing, said device including: a washer formed of a deformable material that encircles said shaft and projects into said groove; a ring formed of an elastomeric material that encircles said shaft and projects into said groove, which ring is exposed to said fluid at high pressure that tends at all times to flow from a position upstream from said ring to a position downstream from said washer, said fluid exerting a pressure on said ring to deform the same and as said ring deforms it transfers a pressure to said washer to deform same, said washer as it deforms having surface portions thereof brought into full fluid-sealing engagement with said first surface and sections of said recessed surface and said surface of said shaft, said washer while deformed having a concave surface portion thereof extending between the upstream circumferential extremities of said portions in said fluid-sealing engagement with said sections of said recessed surface and said surface of said shaft, said ring during said deformation having a downstream convex surface portion thereof in pressure contact with said concave portion, with said ring also having surface portions thereof in fluid sealing contact with sections of said recessed surface and said external surface of said shaft, and said ring when deformed having a slightly convex ring-shaped upstream surface exposed to said fluid at high pressure, said ring as the pressure on said fluid is increased further deforming said washer to force said surface portions of said washer into contact with said sections of said recessed surface and said surface of said shaft into increasingly greater pressure contact therewith.

References Cited in the file of this patent

UNITED STATES PATENTS

| | | |
|---|---|---|
| 2,520,306 | Detweiler | Aug. 29, 1950 |
| 2,788,598 | Bolling | Jan. 22, 1957 |